US008734921B2

(12) United States Patent
De Saint-Romain

(10) Patent No.: US 8,734,921 B2
(45) Date of Patent: May 27, 2014

(54) INK COMPOSITION FOR CONTINUOUS DEFLECTED JET PRINTING, ESPECIALLY ON WET GLASS

(75) Inventor: Pierre De Saint-Romain, Valence (FR)

(73) Assignee: Markem-Imaje, Bourg-les-Valence (FR)

( * ) Notice: Subject to any disclaimer, the term of this patent is extended or adjusted under 35 U.S.C. 154(b) by 175 days.

(21) Appl. No.: 13/256,196

(22) PCT Filed: Mar. 11, 2010

(86) PCT No.: PCT/EP2010/053138
§ 371 (c)(1),
(2), (4) Date: Nov. 17, 2011

(87) PCT Pub. No.: WO2010/103088
PCT Pub. Date: Sep. 16, 2010

(65) Prior Publication Data
US 2012/0058286 A1 Mar. 8, 2012

Related U.S. Application Data

(60) Provisional application No. 61/163,843, filed on Mar. 26, 2009.

(30) Foreign Application Priority Data

Mar. 13, 2009 (FR) ...................... 09 51616

(51) Int. Cl.
H01B 1/20 (2006.01)
C09D 11/10 (2014.01)
B05D 5/00 (2006.01)
B32B 27/08 (2006.01)
B32B 15/08 (2006.01)
B32B 18/00 (2006.01)
B32B 17/10 (2006.01)
B32B 1/02 (2006.01)
C09D 7/12 (2006.01)
B32B 3/14 (2006.01)

(52) U.S. Cl.
USPC ....... 428/34.7; 428/195.1; 428/209; 428/210; 428/211.1; 427/256; 524/233; 524/360; 524/361; 524/540; 524/541; 524/506; 523/122; 252/500; 252/519.31

(58) Field of Classification Search
USPC ................. 428/34.7, 195.1, 209, 210, 211.1; 427/256; 524/233, 360, 540, 541, 506; 523/122; 252/500, 519.31
See application file for complete search history.

(56) References Cited

U.S. PATENT DOCUMENTS

| 4,024,096 A | 5/1977 | Wachtel |
| 4,045,397 A | 8/1977 | Parkinson |
| 4,115,329 A | 9/1978 | Noshiro et al. |
| 4,153,593 A | 5/1979 | Zabiak et al. |
| 4,155,767 A | 5/1979 | Specht et al. |
| 4,260,531 A | 4/1981 | Wachtel et al. |
| 4,338,133 A | 7/1982 | Toyoda et al. |
| 4,465,800 A | 8/1984 | Bhatia |
| 4,567,213 A | 1/1986 | Bhatia et al. |
| 4,756,758 A | 7/1988 | Lent et al. |
| 4,834,799 A | 5/1989 | Song |
| 4,880,465 A | 11/1989 | Loria et al. |
| 5,102,458 A | 4/1992 | Lent et al. |
| 5,173,526 A | 12/1992 | Vijayendran et al. |
| 5,316,575 A | 5/1994 | Lent et al. |
| 5,395,431 A | 3/1995 | Siddiqui et al. |
| 5,395,432 A | 3/1995 | Nelson et al. |
| 5,594,044 A | 1/1997 | Yang |
| 5,596,027 A | 1/1997 | Mead et al. |
| 5,637,139 A | 6/1997 | Morelos et al. |
| 5,652,286 A | 7/1997 | Deng |
| 5,693,127 A | 12/1997 | Nigam et al. |
| 5,934,468 A | 8/1999 | Scott |
| 5,936,027 A | 8/1999 | Zahrobsky et al. |
| 5,998,502 A | 12/1999 | Burr et al. |
| 6,251,175 B1 | 6/2001 | Zhu et al. |
| 6,441,106 B1 | 8/2002 | Goda et al. |
| 6,478,861 B1 | 11/2002 | Kwan et al. |
| 6,726,756 B1 | 4/2004 | Zou et al. |
| 6,875,807 B2 | 4/2005 | Durairaj et al. |
| 7,081,158 B2 | 7/2006 | Sabys et al. |
| 7,148,268 B2 | 12/2006 | Zhu et al. |
| 7,279,511 B2 | 10/2007 | Zhu et al. |
| 2010/0028632 A1 | 2/2010 | Goustiaux et al. |

FOREIGN PATENT DOCUMENTS

| CA | 2 175 012 | 10/1996 |
| EP | 0 289 141 A2 | 11/1988 |
| EP | 0 510 572 A2 | 10/1992 |
| EP | 0 735 120 A2 | 10/1996 |

(Continued)

OTHER PUBLICATIONS

French Search Report in French Application No. FR 0951616, dated Nov. 18, 2009.

(Continued)

Primary Examiner — Vu A Nguyen
(74) Attorney, Agent, or Firm — Nixon Peabody LLP

(57) ABSTRACT

Ink composition for continuous deflected jet printing, that is liquid at ambient temperature, comprising a solvent containing less than 0.5% by weight of water and less than 0.5% by weight of alcohols relative to the total weight of the ink composition; one or more dye(s) and/or pigment(s) that is (are) insoluble in water, and in mixtures of water and of at least one alcohol; and a binder, comprising at least 50% by weight, relative to the total weight of the binder, of at least one binder resin capable of being obtained by reaction between at least one alkoxysilane and at least one hydroxyaromatic resin.

85 Claims, No Drawings

(56) References Cited

FOREIGN PATENT DOCUMENTS

| | | |
|---|---|---|
| EP | 0 928 321 B | 7/1999 |
| EP | 1 086 972 A1 | 3/2001 |
| EP | 1 533 350 | 5/2005 |
| ES | 2 294 435 | 4/2008 |
| FR | 2 862 557 | 5/2005 |
| FR | 2 912 414 A1 | 8/2008 |
| GB | 2 286 402 A | 8/1995 |
| GB | 2 298 713 A | 9/1996 |
| WO | WO 92/14794 A1 | 9/1992 |
| WO | WO 92/14795 A1 | 9/1992 |
| WO | WO 95/29287 A1 | 11/1995 |
| WO | WO 96/23844 A1 | 8/1996 |
| WO | WO 98/13430 A1 | 4/1998 |
| WO | WO 2004/106427 A1 | 12/2004 |

OTHER PUBLICATIONS

International Search Report and Written Opinion in International Application No. PCT/EP2010/053138, mailed Apr. 27, 2010.
International Preliminary Report on Patentability in International Application No. PCT/EP2010/053138, dated Sep. 13, 2011.

INK COMPOSITION FOR CONTINUOUS DEFLECTED JET PRINTING, ESPECIALLY ON WET GLASS

CROSS REFERENCE TO RELATED APPLICATIONS OR PRIORITY CLAIM

This application is a National Phase of PCT/EP2010/053138, filed Mar. 11, 2010, entitled, "INK COMPOSITION FOR CONTINUOUS DEFLECTED JET PRINTING, ESPECIALLY ON WET GLASS", and which claims priority of French Patent Application No. 09 51616, filed Mar. 13, 2009, and U.S. Provisional Patent Application No. 61/163,843, filed Mar. 26, 2009, the contents of which are incorporated herein by reference in their entirety.

The invention relates to an ink composition for marking supports, substrates and objects of all types, especially made of glass, made of ceramic, made of plastic, or else made of metal, the properties of which are particularly suitable for liquid jet printing or marking and very particularly for the continuous deflected inkjet marking of a very large variety of supports.

This ink composition is particularly suitable for marking glass or plastic substrates, especially glass or plastic bottles, under wet conditions, the marking having to withstand rubbing and immersion in water, and being able to be erased or removed by dipping in an alkaline solution.

Inkjet printing is a well known technique, which allows the printing, marking or decoration of all types of objects, at high speed, and without these objects coming into contact with the printing device, with messages that can be varied on demand, such as bar codes, sell-by dates, etc., even on non-planar supports.

Inkjet printing systems can be divided into two main types: "Drop on demand" (DOD) or "continuous jet" (CJ).

We are interested more particularly in the latter technique, more specifically in the continuous deflected jet technique.

Continuous deflected jet spraying consists in sending ink, under pressure, into a cavity containing a piezoelectric crystal, from where the ink escapes via an orifice (nozzle) in the form of a jet. The piezoelectric crystal, vibrating at a given frequency, causes pressure disturbances in the inkjet, which oscillates and gradually breaks up into spherical droplets. An electrode, placed in the path of the jet, where it breaks up, makes it possible to give these drops an electrostatic charge, if the ink is conductive. The drops thus charged are deflected in an electric field and allow the printing.

The drops that are not charged, and therefore are not deflected, are recovered in a drop collector, where the ink is sucked up, then recycled into the ink circuit.

This type of inkjet spraying provides contactless marking at high throughput speed on objects that are not necessarily planar and with the possibility of changing the message at will.

Ink compositions suitable for continuous deflected jet spraying must satisfy a certain number of criteria inherent in this technique, relating, inter alia, to the viscosity, the electrical conductivity, the solubility in a solvent for cleaning, the compatibility of the ingredients, the correct wetting of the supports to be marked, etc.

Furthermore, one particular and important criterion that the ink compositions capable of continuous deflected jet spraying must satisfy stems, on the one hand, from the fact that the ink consumption is low when the number of characters printed per message is low and, on the other hand, from the fact that the jet is continuous and that the ink recirculates numerous times before being sprayed. This ink is therefore in contact with the ambient air when the drops that are not deflected are sucked up. Therefore, it may be caused to absorb ambient moisture and/or to react with oxygen from the air, and it may thus be modified. Despite this situation, the ink will have to retain its essential properties both during storage and during its circulation in the printer.

Finally, these inks must dry rapidly, be capable of passing through the nozzle without blocking it, with a high stability of orientation of the jet while at the same time allowing easy cleaning of the print head.

The ingredients that make up current inks, for the inkjet of the continuous deflected jet type, are organic or mineral products; they are dyestuffs, such as dyes or pigments, resins or binders, in one or more solvent(s) that is (are) more or less volatile, or in water, and optionally one or more conductivity salt(s), and also various additives.

The dyestuffs are known as "dyes or pigments" depending on whether they are respectively soluble or insoluble in the solvent used.

The pigments, which are by nature insoluble, are therefore dispersed and may be opaque or non-opaque. They give the ink its colour, its opacity, or specific optical properties, such as fluorescence (see patents or patent applications U.S. Pat. No. 4,153,593, U.S. Pat. No. 4,756,758, U.S. Pat. No. 4,880,465, EP-A-0 289 141, U.S. Pat. No. 5,395,432, GB-A-2 298 713). In certain cases, the dyes themselves also give the ink sufficient conductivity for it not to be necessary to add a conductivity salt. The dyes known under the name C.I. Solvent Black 27, 29, 35 and 45 are included in this case.

The binder(s) or resin(s) is (are) generally, for the most part, one (or more) solid and polymeric compound(s) and the choice thereof is dictated by their solubility in the selected solvents and by their compatibility with the dyes and the other additives, but also and especially as a function of the properties that they give the film of ink, once dry (see patents or patent applications U.S. Pat. No. 4,834,799, GB-A-2 286 402, U.S. Pat. No. 5,594,044, U.S. Pat. No. 5,316,575, WO-A-96/23844, WO-A-95/29 287).

Their primary function is to provide the ink with adhesion to the maximum number of supports or to specific supports, for example non-porous supports. They also make it possible to give the ink adequate viscosity for the formation of the drops from the jet and they provide the ink, or rather the marking obtained, with most of its properties of resistance to physical and/or chemical attacks.

The solvent of these inks is constituted, most often, of a mixture comprising, on the one hand, a predominant amount of volatile and not very viscous solvents, in order to make it possible for the markings to dry very rapidly and to adjust the viscosity to the desired value, for example from 2 to 10 mPa·s and, on the other hand, more viscous and less volatile solvents that dry more slowly, in a lesser amount, in order to prevent the ink from drying in the nozzle when the printing machine is shut down (see patents or patent applications U.S. Pat. No. 4,155,767, WO-A-92 14794, WO-A-92 14 795 and U.S. Pat. No. 4,260,531).

The volatile solvents used most often are alcohols, ketones or esters of low molecular weight, as is indicated in patents U.S. Pat. No. 4,567,213 and U.S. Pat. No. 5,637,139. Among these solvents, mention may essentially be made of methanol, ethanol, 1-propanol and 2-propanol, acetone, methyl ethyl ketone ("MEK"), methyl isobutyl ketone, ethyl acetate and tetrahydrofuran.

The optional conductivity salt(s) provide(s) the ink with the conductivity required for the electrostatic deflection. Reference may be made, on this subject, to document U.S. Pat. No. 4,465,800.

The additives comprise surfactants which modify the wettability or penetrability of the ink (U.S. Pat. No. 5,395,431), in particular those which modify or control the static or dynamic surface tension such as Fluorad® FC 430 from 3M®, agents that inhibit the corrosion induced by the salts mentioned above (see documents EP-A-0 510 752, U.S. Pat. No. 5,102,458), or else additives that protect the ink against the proliferation of bacteria and of other microorganisms: these are biocides, bactericides, fungicides and the like, which are particularly useful in inks that contain water, pH control buffers (see EP-A-0 735 120), and anti-foaming agents.

The traceability of products, and especially of food products, requires the marking of varying information on the packaging of these products. The particular case of marking returnable glass bottles for containing sodas, fruit juices and drinks in general, poses a problem that is particularly difficult to solve.

Specifically, in many countries, glass bottles, in particular glass bottles containing drinks such as carbonated drinks, for instance sodas, are returned and are therefore used several times after washing.

This marking is particularly difficult in the case of bottles containing carbonated drinks, such as sodas, which are filled at low temperature, and this marking is even more difficult when it is carried out in surroundings which may be as humid and hot as those of the countries where the temperature is, for example, 35° C. with, for example, 99% relative humidity.

The new or previously washed bottles are filled with the liquid at the lowest possible temperature (for example in the vicinity of 4° C.) to avoid the evaporation of the carbon dioxide from these drinks such as sodas. In humid and hot surroundings, condensation occurs immediately on the outside of the bottles. In order to guarantee the traceability of the production, these bottles must be marked on the neck, with corresponding information, immediately after filling. Continuous deflected inkjet technology is, with $CO_2$ laser marking, the most suitable technique for this high-speed marking of varying information on these curved surfaces. After inspection, these bottles are handled in order to be put into crates then into pallets and dispatched to the consumer locations. After consumption, the empty bottles are returned to the filling plants and washed in alkaline solutions before a new filling cycle.

The particular requirements which an ink composition used for such marking and also the marking obtained by deposition of this deposited ink must meet are, in particular, the following:

The ink must dry very rapidly on a surface that is very wet, cold and in many cases on which the ambient humidity condenses very considerably.

The ink must dry as rapidly as possible in order to be able to withstand handling during the crate filling operation from only a few seconds to a few minutes after the marking operation.

The marking obtained by deposition of the ink must withstand handling by the consumer after cooling in a refrigerator or a tub of cold or even iced water as long as necessary.

The marking must be erased or removed during the alkaline washing operation. For obvious ecological reasons, this alkaline washing operation must be carried out at as low a pH as possible.

Finally, these properties must remain constant over the entire shelf life of the ink, generally given as 6 to 18 months, and also in the printer at the site of use, under the same humidity and temperature conditions.

None of the inks currently used for continuous jet printing of glass or plastic bottles simultaneously meets all the criteria mentioned above.

There is therefore an unmet need for an ink composition, suitable in particular for continuous deflected jet printing, especially onto substrates such as glass or plastic bottles, which simultaneously meets, inter alia, all of the criteria mentioned above, as a consequence of which, the desired properties are communicated to the ink.

There is still a need for such an ink composition which allows the rapid marking of all types of objects and especially glass or plastic bottles while still giving a marking of excellent quality and uniformity.

The ink must also, generally, exhibit all the properties customarily required of inks for inkjet printers, especially for inks for printers that use the continuous jet technique: viscosity, resistivity, etc. The ink must have, besides the property of rapid drying already mentioned, the property of not obstructing the nozzles and of thus allowing a rapid startup, even after a shutdown of long duration.

The objective of the invention is therefore to provide an ink composition, suitable in particular for continuous deflected jet printing, which meets, inter alia, all of the needs indicated above, which satisfies the criteria and requirements mentioned above, and which does not have the drawbacks limitations, failings and disadvantages of the ink compositions of the prior art, and which overcomes the problems of the compositions of the prior art. The objective of the present invention is especially to provide an ink composition which has excellent and improved properties, in particular as regards the wet rub resistance of the marking, the solubility of the marking in a medium that is as least alkaline as possible, and the persistence of these essential properties over time.

This objective and others are achieved, in accordance with the invention, by an ink composition for continuous deflected jet printing, that is liquid at ambient temperature, comprising:

a solvent containing less than 0.5% by weight of water, and less than 0.5% by weight of alcohols, relative to the total weight of the ink composition;

one or more dye(s) and/or pigment(s) that is (are) insoluble in water, and in mixtures of water and of at least one alcohol; and a binder, comprising at least 50% by weight, relative to the total weight of the binder, of at least one binder resin capable of being prepared by reaction between at least one alkoxysilane and at least one hydroxyaromatic resin.

The expression "ambient temperature" is understood generally to mean a temperature of 5 to 30° C., preferably of 10 to 25° C., more preferably of 15 to 24° C. and better still from 20 to 23° C. It is clearly understood that the ink is liquid at atmospheric pressure.

Advantageously, the binder resin is capable of being obtained (obtainable) by at least one dealcoholization reaction between the alkoxy group or groups of the alkoxysilane and the aromatic hydroxyl group or groups of the hydroxyaromatic resin.

Advantageously, the binder is constituted by said at least one binder resin, that is to say that the binder comprises 100% by weight of the binder resin.

Advantageously, said alkoxysilane corresponds to the following formula:

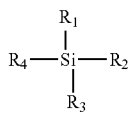

where:

$R_1$ is a linear or branched $C_1$ to $C_4$ alkoxy group;

$R_2$ and $R_3$, independently of one another, represent a group chosen from linear or branched $C_1$ to $C_4$ alkyl groups and linear or branched $C_1$ to $C_4$ alkoxy groups; and $R_4$ represents a linear or branched $C_1$ to $C_{20}$, preferably $C_1$ to $C_{10}$ alkyl group bearing, and/or being interrupted by, at least one functional group X, chosen from epoxy, amino (—$NH_2$), —NH—, =N—, acrylate, carbonyl, (meth)acrylate, anhydride, halogen, vinyl, olefin, isocyanate, and mercapto groups, and —$Si(R_1R_2R_3)$ groups, where $R_1$, $R_2$ and $R_3$ have already been defined above.

Advantageously, $R_4$ is chosen from the groups corresponding to the following formulae:

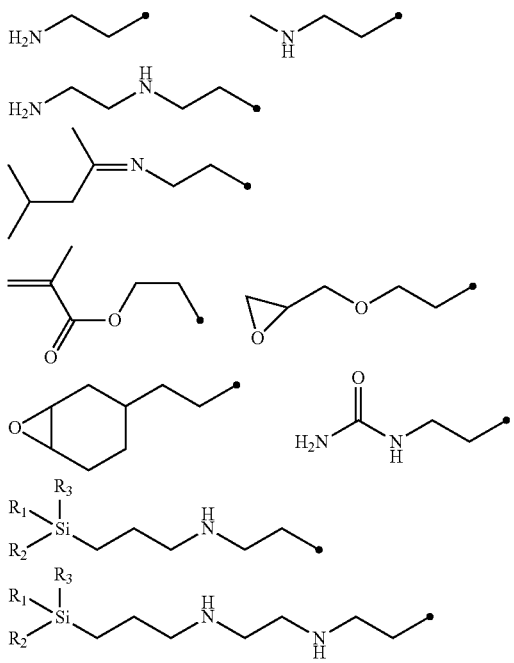

where ● represents the point of attachment of the $R_4$ group with the silicon atom of the alkoxysilane.

Advantageously, said functional group is an amino, —NH— or =N— group, and the alkoxysilane may be defined as being an aminoalkoxysilane in which $R_4$ represents a linear or branched $C_1$ to $C_{20}$, preferably $C_1$ to $C_{10}$ alkyl group bearing and/or being interrupted by at least one group chosen from amino, —NH— and =N— groups.

In such an aminoalkoxysilane, $R_4$ may be chosen, in particular, from the following groups:

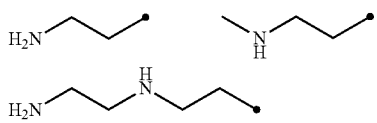

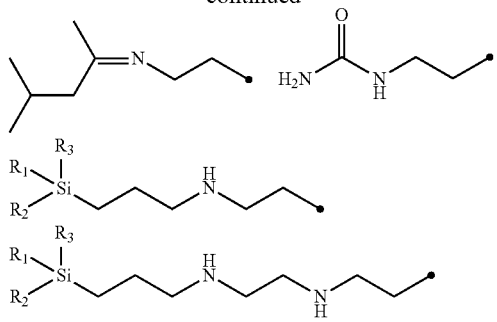

where ● represents the point of attachment of the $R_4$ group with the silicon atom of the alkoxysilane.

Advantageously, such an aminoalkoxysilane may be chosen from: gamma-aminopropyltriethoxysilane, gamma-aminopropyltrimethoxysilane, N-(2-aminoethyl)-3-aminopropyltrimethoxysilane, 3-aminopropylmethyl-diethoxysilane, 3-aminopropyldiisopropylethoxysilane, 3-(1,3-dimethylbutylidene)aminopropyltriethoxysilane, and bis(trimethoxy-silylpropyl)amine.

It is stated that, according to the invention, the expressions "hydroxyaromatic resin" or "hydroxyaromatic polymer" are understood to mean any polymer comprising —OH groups borne by an aromatic group, more specifically any polymer comprising, preferably constituted by, hydroxyaromatic repeating units.

The aromatic group of the hydroxyaromatic unit is generally chosen from carbon-based aromatic groups. This carbon-based aromatic group may comprise from 1 to 3 carbon-based rings each comprising from 6 to 10 carbon atoms, such as the phenyl group. Preferably, the aromatic group comprises a single carbon-based ring which is preferably an optionally substituted phenyl group. A more preferred hydroxyaromatic unit is the hydroxyphenyl unit.

The hydroxyaromatic units may be directly joined to one another by a single bond, or else they may be joined by a linkage group such as an alkylene group, preferably a linear or branched alkylene group having 1 to 6 carbon atoms, more preferably 1 to 3 carbon atoms, or a linear or branched oxyalkylene group having 1 to 6 carbon atoms, preferably 1 to 3 carbon atoms.

The aromatic rings may be joined to one another in the ortho, meta or para position relative to the hydroxyl group, preferably in the ortho and/or para position.

The aromatic rings may (besides the —OH group) be substituted by one or more other substituent(s) chosen from alkyl and alkoxy groups having 1 to 6 carbon atoms, halo(C1-C6) alkyl groups, hydroxy(C1-C6)alkyl groups, (C1-C6)alkyl-carbonyl groups, amino(C1-C6)alkyl groups, cyano(C1-C6) alkyl groups, or (C1-C6)alkoxy(C1-C6)alkyl groups.

The hydroxyaromatic polymers may be homopolymers or else copolymers, that is to say that they then comprise, besides the hydroxyaromatic units, other units derived, for example, from (meth)acrylic or (meth)acrylate monomers.

Preferred hydroxyaromatic resins are hydroxyphenolic or phenolic resins.

It is stated that, according to the invention, the expressions "hydroxyphenolic resin" or quite simply "phenolic resin" are understood to mean any polymer comprising phenolic OH groups.

Advantageously, the hydroxyphenolic resins may be chosen from novolac resins and hydroxystyrene polymers.

Novolac resins are derived from the polycondensation of a phenol and formaldehyde in the presence of an acid catalyst, and their structural formula is generally recognized as being the following:

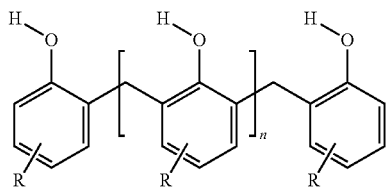

where n is an integer between 0 and 10 and R is H or an alkyl group generally having 1 to 6 carbon atoms such as a methyl group.

The expression "hydroxystyrene polymers" is understood to mean hydroxystyrene homopolymers and the copolymers of hydroxystyrene with other monomers such as (meth)acrylates.

Such polymers are described, in particular, in documents WO-A-98/13430 and U.S. Pat. No. B1-6,251,175, to the descriptions of which reference may be made.

A binder resin that is particularly preferred according to the invention is capable of being obtained by reaction between an aminoalkoxysilane and a hydroxystyrene polymer.

No prior art document describes an ink having all the specific features of the ink composition according to the invention, namely a specific binder, a solvent comprising less than 0.5% by weight of water and less than 0.5% by weight of alcohols, and one or more dye(s) and/or pigment(s) that is (are) insoluble in water, and in mixtures of water and of at least one alcohol.

The specific binder of the ink composition according to the invention comprises at least 50% by weight, preferably at least 60% by weight, more preferably at least 80% by weight of at least one specific binder resin which may be defined, generally, as being a resin capable of being obtained by reaction of at least one alkoxysilane with at least one hydroxyphenolic resin.

More specifically, the predominant binder resin in the binder is capable of being obtained under conditions such that at least one dealcoholization reaction occurs between the alkoxy group(s) of the alkoxysilane and the aromatic hydroxyl group(s) of the hydroxyaromatic resin, especially of the hydroxyphenolic resin.

The expression "the aromatic hydroxyl group(s) of the hydroxyaromatic resin" is understood to mean the hydroxyl group(s) borne by the aromatic groups of the resin, more specifically by the carbon-based rings of these groups such as the phenyls.

Generally, this dealcoholization reaction is the predominant reaction that takes place between the alkoxysilane and the hydroxyaromatic, in particular hydroxyphenolic, resin.

In certain cases, this dealcoholization reaction may optionally be the only reaction that takes place between the hydroxyaromatic, in particular hydroxyphenolic, resin and the alkoxysilane.

Alongside this dealcoholization reaction, other reactions may take place between the hydroxyaromatic, in particular hydroxyphenolic, resin and the alkoxysilane, such as a condensation reaction of the alkoxysilane with itself, and/or a crosslinking reaction of the hydroxyphenolic resin with itself, and/or other reactions that are not completely elucidated, but these reactions are generally minor compared to the major predominant reaction which remains the dealcoholization reaction, and in certain cases these minor reactions are completely absent.

Moreover, the reaction conditions between the hydroxyaromatic resin and the alkoxysilane and, in particular, the solvent of this reaction are generally chosen so that a hydrolysis/alcoholysis reaction, by the water or an alcohol, of the alkoxy groups of the alkoxysilane is substantially, preferably completely, avoided.

Such reaction conditions between the alkoxysilane and the hydroxyaromatic resin may be easily determined by a person skilled in the art in this field of the art.

As regards the dealcoholization reaction conditions, reference may be made to the description of patent applications WO-A1-2004/106427 and EP-A1-1 086 972 which are set in technical fields far removed from that of ink compositions.

This dealcoholization reaction may be carried out in solution in any suitable organic solvent. Generally, this organic solvent is chosen so that it does not interfere in the reaction between the hydroxyaromatic resin and the alkoxysilane and especially in the dealcoholization reaction between the alkoxy groups of the alkoxysilane and the aromatic hydroxyl groups of the hydroxyphenolic resin and so that it does not give rise to a hydrolysis/alcoholysis reaction of the alkoxy groups.

In other words, it is preferable to avoid solvents that are capable of reacting with the alkoxy groups of the silane such as water or alcohols.

The solvent for the reaction between the alkoxysilane and the hydroxyaromatic resin such as a hydroxyphenolic resin should thus generally comprise less than 0.5% by weight of water and less than 0.5% by weight of alcohols, preferably less than 0.1% by weight of water and less than 0.1% by weight of alcohols, more preferably less than 0.05% by weight of water and less than 0.05% by weight of alcohols, better still the solvent should be essentially free of water and of alcohols (0% by weight of water and of alcohols).

By operating under such conditions, which may be qualified as "anhydrous" and "alcohol-free", the hydrolysis/alcoholysis reaction of the alkoxy groups that leads to silanol groups is avoided.

It is thus possible to choose this solvent of the reaction from ketones, preferably from aliphatic ketones having 3 to 10 carbon atoms, such as acetone, butanone (methyl ethyl ketone), 2-pentanone (methyl propyl ketone), 3-methyl-2-butanone (methyl isopropyl ketone) and 4-methyl-2-pentanone (methyl isobutyl ketone), and cyclic ketones such as cyclohexanone; dimethylformamide (DMF); dimethylacetamide (DMAc); and mixtures thereof.

One solvent preferred above all is constituted by methyl ethyl ketone (MEK).

Preferably, the solvent of the reaction between the alkoxysilane and the hydroxyaromatic resin, such as a hydroxyphenolic resin, may be constituted by one or more ketone(s) preferably chosen from acetone, methyl ethyl ketone, methyl propyl ketone, methyl isopropyl ketone and methyl isobutyl ketone.

In a first embodiment of the preparation of the resin of the binder, the solvent of the reaction is the same solvent as that of the ink composition, such as a ketone, which simplifies the preparation of the ink composition. In other words, in this first embodiment, the solvent of the ink composition is the solvent which was used for the preparation of the resin of the binder without this resin being separated or isolated from said solvent.

Or else in a second embodiment of the preparation of the resin of the binder, the resin may be prepared in a first solvent, separated from the latter, isolated, then be incorporated into the ink composition which comprises a second solvent.

This reaction may also be carried out without solvent.

The reaction between the hydroxyaromatic resin, such as a hydroxyphenolic resin, and the alkoxysilane may be carried out at ambient temperature. But this reaction may advantageously be carried out by heating the hydroxyaromatic, in particular hydroxyphenolic, resin, the alkoxysilane and the solvent at a temperature above ambient temperature, preferably greater than or equal to 40° C., more preferably from 40° C. to the boiling point of the solvent, better still from 40° C. to 80° C., especially 70° C., for a duration of 1 to 72 hours, preferably from 12 to 60 hours, more preferably from 24 to 48 hours, in order to accelerate the reaction.

It has also been observed, surprisingly, that when the reaction was carried out at a temperature above ambient temperature, the ink containing the resin thus prepared was rendered more stable over time, over a duration which may reach and exceed six months, and which may possibly range up to 12 months. Therefore, the production of a stable ink is rendered more industrial.

Advantageously, the molar ratio of the alkoxysilane groups of the alkoxysilane compound to the hydroxyaromatic, in particular hydroxyphenolic, resin is from 0.05 to 3.00. Specifically, it has been observed that such a ratio made it possible to prevent parasitic reactions, which cause a loss of solubility in the solvent, such as a crosslinking, from occurring contrary to what is described, for example, in document U.S. Pat. No. 4,045,397, which is commented on below.

The molar ratio of the alkoxysilane groups to the hydroxyaromatic, in particular hydroxyphenolic, resin is calculated in the following manner:

$$S*NA/NL$$

S=number of moles of silane.
NA=number of alkoxysilane groups per molecule of silane.
NL=number of moles of hydroxyaromatic, in particular hydroxyphenolic, resin.

The invention is based on the surprising observation that the product of the reaction of a hydroxyaromatic, in particular hydroxyphenolic, resin with an alkoxysilane, especially under conditions that specifically lead to at least one dealcoholization reaction between the alkoxy group(s) of the alkoxysilane and the aromatic hydroxyl groups of the resin, makes it possible to formulate an ink, particularly suitable for continuous deflected jet spraying, and that gives markings that have an excellent adhesion to all types of substrates, especially to glass and plastics, even under relatively high temperature and humidity conditions; moreover, these markings may, surprisingly, also be easily removed or erased by dissolution in an alkaline solution, even one of low concentration.

Even more surprisingly, these adhesion properties, especially to glass and solubility properties in an alkaline solution are preserved over time, even after storage of the ink, for a duration which may reach and exceed six months, and which may even range up to 12 months, or even longer.

According to a second fundamental feature of the ink composition according to the invention, unlike ink compositions of the prior art, the ink composition according to the invention comprises a very low proportion of water. Thus, the ink composition according to the invention generally comprises less than 0.5% by weight of water, preferably less than 0.1% by weight of water, more preferably less than 0.05% by weight of water relative to the total weight of the ink; better still the solvent and the ink composition may be considered to be essentially free of water (0% by weight of water).

Since the water introduced is found as an impurity in the various components of the ink, the higher the degree of purity of the components chosen, the lower the content of water will be. In fact, it could be said that the ink according to the invention does not contain added water but only water introduced as an impurity by the various constituents of the ink.

This absence or near absence of water is also one of the features that differentiates the ink composition according to the invention from the compositions of the prior art.

Specifically, in the prior art, water is generally added in order to help either to obtain a sufficient conductivity, or to obtain the solubility of the dye, or else to allow the hydrolysis of the silane, when it is present. On the other hand, according to the invention, the ink composition contains as little water as possible, or even does not contain any water at all. Indeed, it has been shown that water had an unfavourable influence on the permanence of the properties of the ink composition over time and that its absence or its presence in a very small amount therefore surprisingly ensured the permanence over time of all of the advantageous properties of the ink according to the invention.

In other words, it has been demonstrated, according to the invention, in particular that, completely surprisingly, the alkoxysilanes react with hydroxyaromatic, in particular hydroxyphenolic, resins especially in a ketone medium and that the result of this reaction, especially in the case of well defined proportions of the alkoxysilane and of the hydroxyaromatic, in particular hydroxyphenolic, resin make it possible to obtain both a good adhesion to wet glass, and solubility in an alkaline medium especially when the ink composition contains only very little or no water.

It is very surprising that an ink composition such as that according to the invention based on an alkoxysilane, which is a very reactive compound, especially with respect to glass, permits a solubility of the deposits, markings obtained from the ink composition, in weakly alkaline solutions, for example 0.1 to 5% by weight solutions of sodium hydroxide, while giving these deposits or markings, a good adhesion and rub resistance.

It is also surprising to observe that formulations such as the compositions according to the invention based on silanes as reactive as the alkoxysilanes can give compositions whose initial properties are maintained during storage over durations which may exceed 6 months.

The following are not obvious from the ink compositions described in the prior art documents:
  the use of a binder comprising a specific binder resin derived from a reaction between an alkoxysilane and a hydroxyphenolic resin, more particularly a binder resin derived from a specific dealcoholization reaction between an alkoxysilane and a hydroxyaromatic resin such as a hydroxyphenolic resin; and
  that the choice of a solvent that comprises no or little water and alcohols and preferably comprises ketones, could result in the properties presented by the ink compositions according to the invention, while the prior art documents state that the presence of water is acceptable, or even necessary.

Indeed, a great majority of the prior art documents and even more so the documentation of the alkoxysilane manufacturers suggest that the adhesion of the marking to the glass is obtained by virtue of the reaction between the hydroxyl groups at the surface of the glass and the silanols derived from the hydrolysis of the alkoxysilanes and from the condensation thereof. In the composition according to the invention, although such hydrolysis and condensation reactions of the alkoxysilanes are generally avoided, although silanol groups are not present in the resin of the binder and in any case are not present in an amount which could provide an adhesion to a substrate, and although the composition comprises little or no water, an excellent adhesion of the marking to any type of substrate, and especially to glass, is however obtained.

According to the invention, the reaction between the alkoxysilane and the hydroxyaromatic resin, such as a hydroxyphenolic resin, involves in particular, generally predominantly a specific dealcoholization reaction between the alkoxy groups of the alkoxysilane and the aromatic hydroxyl groups of the hydroxyaromatic, in particular hydroxyphenolic, resin which takes place in the absence of water or of any other solvent which may lead to the hydrolysis of the alkoxy groups of the silane.

The reaction between the hydroxyaromatic resin and the alkoxysilane, which generally involves at least one dealcoholization reaction, is not a hydrolysis reaction. Moreover, this reaction takes place during the preparation of the ink, prior to the use thereof, to the spraying thereof, to the deposition thereof, and not on the support, in the marking, as with the ink compositions of the prior art.

In fact, the resin of the binder of the ink according to the invention does not generally comprise free silanol groups or alkoxy groups which may result, via hydrolysis, in such groups.

Without wishing to be bound by any theory, it may be considered that the adhesion, to the glass, of the marking obtained with the ink composition according to the invention is not therefore due to the reaction of the hydrolysed alkoxysilane groups on the glass since the presence in the reaction medium, in stoichiometric amounts, of the alcohol derived from the reaction between the alkoxy groups of the alkoxysilane and the aromatic hydroxyl groups of the hydroxyaromatic, in particular hydroxyphenolic, resin clearly shows that the original alkoxysilane groups have disappeared and that it is clearly this reaction which has principally, or even exclusively, taken place.

According to another important feature of the ink composition according to the invention, and unlike the ink compositions of the prior art, the ink composition according to the invention contains a very small amount of alcohols.

Thus, the ink composition according to the invention generally comprises less than 0.5% by weight of alcohols, preferably less than 0.1% by weight of alcohols, more preferably less than 0.05% by weight of alcohols relative to the total weight of the ink, better still the solvent, and the ink composition may be considered to be essentially free of alcohols (0% by weight of alcohols).

In fact, the alcohol optionally present in the ink composition, in the case where the ink composition is prepared with the reaction medium that has been used for the preparation of the resin of the binder, is only the alcohol which is released during the chemical reaction of the alkoxysilane groups with the hydroxyaromatic groups, for example the phenol groups of the novolac resins.

The low content or absence of alcohols in the ink composition according to the invention favours the high-speed printing for which a very high evaporation rate is necessary.

The absence of alcohol and optionally of solvent that is too miscible with water in the ink composition according to the invention allows a better quality of printing when the supports to be marked, such as glass bottles, are covered with water by condensation. Ketones in particular enable good quality printing.

According to one fundamental aspect of the invention, the inks according to the invention give markings that are resistant to immediate rubbing, withstand prolonged immersion in water, even cold water, and disappear by dissolving in an alkaline solution according to the requirements of application onto returnable glass.

Whether an ink composition containing the reaction product of a hydroxyaromatic resin, in particular of hydroxyphenolic type, with an alkoxysilane such as an aminoalkoxysilane in a water-free and alcohol-free solvent, especially in a ketone medium, and in the presence of a water-insoluble dye, can give markings that have such a combination of remarkable properties is neither mentioned nor suggested in the prior art.

It has been demonstrated that the combination of all the features listed above that define the ink composition according to the invention is critical in order for the ink composition according to the invention to have all the effects and advantages described in the present document, especially in relation to the persistence of its qualities during prolonged storage.

The composition according to the invention is neither described nor suggested in the prior art, provides a solution to the problems posed by the compositions of the prior art and does not have the drawbacks, failings and disadvantages of the compositions of the prior art.

Thus, document U.S. Pat. No. 4,045,397 describes an ink composition for inkjet printing which contains, as essential ingredients:
- a binder in the form of a low molecular weight novolac resin that is soluble in water and alcohols;
- a dye that is soluble in water and alcohols;
- an organosilicon compound of silane or silanol type having a functional group, such as an amino, mercapto or olefin group, in an organic group attached to the silicon atom; and
- a diluent in the form of a low boiling point alcohol, optionally with a small amount of water.

According to column 3, it is indicated that the organosilicon compound and the novolac resin remain compatible in order to form a solution that is stable in water or a mixture of water and of an alcohol, which enables use in inkjet printing, while this resin and this compound set upon drying to form a water-resistant marking that bonds strongly to glazed surfaces of glass and of ceramics and is sufficiently resistant to exposure to boiling water or to steam or to other high humidity conditions.

In the absence of the organosilicon compound, the insolubilization and adherence of the marking to glazed ceramic surfaces are not obtained.

In this document, it is assumed that, upon drying, the amino group or other functional group of the organosilicon compound or else the hydroxyl group of the hydrolysis product of the latter reacts with the "solubilized" hydroxyl groups of the novolac resin, whereby the organosilicon compound is integrated into the phenol-aldehyde resin in order to form a phenol-aldehyde-silanized compound resin which becomes sufficiently crosslinked to become water resistant and which is preferably attracted to the silicon oxide groups on the surfaces of the ceramic substrate.

The binder of the ink from this document, before its application, spraying onto a substrate, contains separately, on the one hand, the organosilicon compound and, on the other hand, the novolac resin without any reaction occurring between them since it is indicated that they "remain compatible to form a solution that is stable in an alcoholic or aqueous-alcoholic solvent".

A reaction occurs between these compounds only upon drying on the substrate, in the marking, the solvent being removed, and furthermore the reaction which is described in column 3, between the hydroxyl groups of the hydrolysed novolac resin and the amino groups or hydroxyl groups (in the case of the hydrolysed silanol) of the silane is not the specific dealcoholization reaction that preferably occurs in the binder according to the invention between the alkoxy groups of the silane and the aromatic hydroxyl groups, for example the phenol groups of a novolac resin.

Indeed, in this document the alkoxy groups of the silane are not involved in the reaction, since the groups that react are either amino groups or hydroxyl groups that originate specifically from the hydrolysis, in an aqueous medium, of the alkoxy groups.

The solvent of this document contains water and alcohols and the teachings of this document dissuade from using a solvent without water or alcohol, such as a ketone-based solvent, and water-insoluble dyes.

Moreover, the surprising effects of a good adhesion to wet glass and of a solubility in an alkaline medium which are due, in particular, to the binder used according to the invention are absolutely not suggested in this document.

Document U.S. Pat. No. 4,024,096 relates to an ink for inkjet printing comprising a novolac type resin, a soluble dye, an evaporation retardant, a thiocyanate and a C1-C5 alcohol with up to 80% water.

It is never mentioned, nor suggested, in this document that the medium may be free of water and of alcohols and may especially be a ketone in the absence of water, and in the presence of silane.

According to column 2, line 61-column 3, line 3, the objective of this composition is specifically to overcome the drawbacks of compositions comprising, besides the novolac resin, organosilanes, by avoiding using the latter.

Specifically, according to column 1, line 62 to column 2, line 2, the inks comprising a novolac resin and an organosilane, as a mixture with a triarylmethane dye or with aqueous-alcoholic solvents, exhibit precipitation phenomena and their drying rates are not satisfactory.

This document dissuades from using a novolac resin with an organosilane.

Document U.S. Pat. No. 4,338,133 describes an ink composition for inkjet printing which comprises, as a "binder precursor", an alkoxysilane (see column 2, line 31 to column 3, line 2: aminosilanes are neither cited nor suggested) or an oligomer of the latter in a proportion generally from 2 to 60% by weight, in a solvent chosen from lower alcohols and lower aliphatic alcohol glycol ethers. Ketones are not cited.

In column 3, lines 9 to 13, it is indicated that the alkoxysilane or the oligomer thereof is hydrolysed and condensed to form a polymer and to adhere the latter firmly to a printing surface such as glass.

The composition also comprises a dye that is soluble in the solvent.

The composition comprises, in addition, an acid as a stabilizer for the alkoxysilane and as a condensation accelerator during a drying step, in order to improve the ink storage stability and the ink drop formation stability and also to accelerate the drying and to improve the adhesion to the glass.

According to column 5, lines 55 to 59, it is possible to introduce into the composition up to 10% by weight of water based on the alkoxysilane or the oligomer thereof, in order to improve the hydrolysis of the alkoxysilane or of the oligomer.

According to column 4, line 60-column 5, line 7, in order to improve the adhesion to plastics, a resin that is soluble in the solvent and "mutually soluble with the alkoxysilane or the oligomer thereof can be incorporated into the composition". This resin may especially be a novolac resin.

Moreover, it should be noted that the objective of the composition from this document is to overcome the drawbacks of the compositions from document U.S. Pat. No. 4,045,397 analysed above. It is indicated in column 1, lines 58 to 68 that the compositions from said document which comprise a silane "coupling agent" do not have a good chemical stability.

In this document, the novolac resin is an optional component and a reaction does not take place between the novolac resin and the alkoxysilane or its oligomer. The resin and the silane are simply soluble in or miscible with one another.

The ink contains, before spraying, the alkoxysilane which is defined as a binder precursor and this alkoxysilane forms a polymer by hydrolysis then accelerated condensation by an acid (which is not present). This polymer forms, during a drying step, on the substrate.

This polymer therefore originates from a condensation exclusively between the alkoxysilane molecules or the molecules of its oligomer without the optional other resins such as the novolac resin taking part in the reaction.

Moreover, this document dissuades from using a coupling agent, that is to say very certainly a silane, comprising amino functional groups, in particular with a novolac resin.

Document U.S. Pat. No. 5,652,286 describes ink compositions for inkjet printing onto wet glass supports that contain silanes of the epoxysilane type, such as glycidyloxypropyltrimethoxysilane, but not aminosilanes. The combination of these silanes with hydroxyaromatic resins, especially of novolac type, is neither described nor suggested.

Document U.S. Pat. No. 7,279,511 also describes ink compositions for inkjet printing onto wet glass supports which may contain aminosilanes, but no presence of a hydroxyaromatic resin, especially a novolac resin, is mentioned.

Documents U.S. Pat. No. 4,567,213, U.S. Pat. No. 5,934,468, U.S. Pat. No. 6,478,861, U.S. Pat. No. 6,726,756, U.S. Pat. No. 7,148,268, U.S. Pat. No. 5,596,027 describe ink compositions that may be sprayed by the continuous deflected jet technique and that comprise epoxysilane-type alkoxysilanes, optionally ketone-type solvents, but in the absence of hydroxyaromatic resins, especially of novolac type.

Document U.S. Pat. No. 5,693,127 describes compositions containing alkoxysilane polyethylene-imines that give exceptional adhesion to wet glass. The use of this type of silane in inkjet inks for marking glass results in markings which are particularly difficult to erase during a washing operation in an alkaline medium.

Finally, documents U.S. Pat. No. 6,251,175 and EP-A-0 928 321 (WO-A-98/13430) describe inkjet sprayable ink compositions comprising hydroxyphenolic type resins. It is mentioned that these hydroxyphenolic resins may optionally be combined with a large number of different silanes, but the preparation of a binder by reaction of these hydroxyphenolic resins with alkoxysilanes and especially aminoalkoxysilanes, in particular under conditions that specifically lead to a dealcoholization reaction is neither described nor suggested.

The preferred solvents are alcohols. When non-aqueous solvents are used, it is preferable to add small amounts of water in order to ensure the conductivity. The compositions of the examples from these documents which comprise both a silane and a hydroxyphenolic resin (examples 1, 3 and 6) contain a large amount of ethanol and/or of water in a proportion of 1.5 to 2% by weight of the weight of the composition.

Moreover, it is neither mentioned nor suggested in this document that such a binder can give the ink composition properties of adhesion, of solubility in alkaline solutions and of stability over time of these properties.

The binder of the ink composition according to the invention comprising, preferably constituted by, a binder resin capable of being obtained (obtainable) by reaction between the alkoxy groups of at least one alkoxysilane and the hydroxyl groups of at least one hydroxyphenolic resin generally represent from 0.1 to 30% by weight, preferably from 1 to 25% by weight, more preferably from 3 to 20% by weight of the total weight of the ink composition.

Besides the binder resin that is capable of being obtained by reaction between at least one alkoxysilane and at least one hydroxyaromatic resin, the binder of the ink composition according to the invention may also comprise one or more other binder resin(s) generally chosen from resins that are soluble in the solvent of the ink composition such as resins that are soluble in ketone solvents for instance polyacrylates, polymethacrylates, polystyrenes and copolymers thereof, epoxy resins, epoxy phenolic resins, melamines, and rosin derivatives.

The solvent of the ink composition according to the invention generally represents from 30 to 90% by weight, preferably from 60 to 80% by weight, of the total weight of the ink composition.

The solvent may be chosen from ketones, preferably from aliphatic ketones having 3 to 10 carbon atoms, such as acetone, butanone (methyl ethyl ketone), 2-pentanone (methyl propyl ketone), 3-methyl-2-butanone (methyl isopropyl ketone) and 4-methyl-2-pentanone (methyl isobutyl ketone), and cyclic ketones such as cyclohexanone; and mixtures thereof.

The solvent is preferably constituted by one or more ketone (s) preferably chosen from acetone, butanone (methyl ethyl ketone), 2-pentanone (methyl propyl ketone), 3-methyl-2-butanone (methyl isopropyl ketone) and 4-methyl-2-pentanone (methyl isobutyl ketone).

One solvent that is preferred above all is constituted by methyl ethyl ketone (MEK).

One or more organic solvent(s) other than those mentioned above, such as ketones, may be added in a minority proportion by weight relative to the total weight of the solvent, in order to optimize the properties of the inks. These minority solvents may be chosen from esters and ethers of ethylene glycol or of propylene glycol and acetals.

The dye(s) and/or pigment(s) may be chosen from all the dyes or pigments suitable for the intended use that are known to a person skilled in the art, some of these pigments or dyes have already been mentioned above.

The dyes and pigments will generally be chosen from the dyes and pigments known under the name of "C.I. Solvent Dyes" and "C.I. Pigments".

As examples of the most common pigments and dyes, mention may be made of C.I. Solvent Black 29, C.I. Solvent Black 7, C.I. Solvent Black 28, C.I. Solvent Black 35, C.I. Solvent Blue 70, C.I. Solvent Red 124, dispersions of Pigment Blue 60 or of Pigment Blue 15.

One preferred solvent is C.I. Solvent Black 29.

The total amount of dye(s) and/or of pigment(s) is generally from 0.05 to 25% by weight, preferably from 1 to 20%, more preferably from 3 to 10% by weight of the total weight of the composition.

Preferably, a dye or pigment for which the water solubility is the lowest, which is insoluble in water and which is insoluble in mixtures of water and of at least one alcohol, will be chosen.

The expression "water-insoluble dye or pigment" is generally understood to mean a dye or pigment which, added at 1% in demineralized water, does not dye the water in a manner that is visible to the eye.

The expression "dye insoluble in mixtures of water and of at least one alcohol" is generally understood to mean a dye or pigment which, added at 1% in said mixture, does not dye the mixture in a manner that is visible to the eye.

The ink composition may, in addition, comprise one or more plasticizer(s) (of the resin(s) or polymer(s) of the binder) chosen, for example, from the plasticizers that are known to a person skilled in the art and chosen as a function of the binder used comprising one or more polymer(s) and/or resin(s). Mention may be made, for example, as a plasticizer, of thermoplastic polyurethanes.

The plasticizer(s) is (are) generally present in an amount of at least 0.05%, preferably from 0.1 to 20% by weight of the total weight of the ink composition.

The composition according to the invention may, in addition, optionally comprise at least one conductivity salt.

Indeed, since the ink according to the invention is applied by continuous jet, it must have a sufficient electrical conductivity, generally greater than 5 µS/cm at 20° C., preferably greater than or equal to 300 µS/cm, more preferably greater than or equal to 500 µS/cm, and better still around 500 to 2000 µS/cm (at 20° C.), or more.

Since the products that provide the ink with the necessary conductivity for continuous jet spraying are ionisable compounds, such as salts, it is possible that the dyes, already present in the ink, give sufficient conductivity to the latter for there to be no need to add an actual conductivity salt: this is the case for the compounds known under the name "C.I. Solvent Black 27, 29, 35 and 45", already cited.

However, it will often be necessary to include, in the ink composition, a conductivity salt other than the dyes and which is generally chosen from the salts of alkali metals, the salts of alkaline-earth metals and the salts of simple or quaternary ammoniums, said salts being in the form of halides (chlorides, bromides, iodides, fluorides), perchlorates, nitrates, thiocyanates, formates, acetates, sulphates, propionates, hexafluorophosphates, hexafluoroantimonates, etc.

When the markings obtained with this composition have to be water resistant, these salts will be chosen from those which are the most insoluble in water, such as fatty chain quaternary ammoniums and hexafluorophosphates or antimonates.

These conductivity salts will therefore be present, if necessary, in the ink composition so as to impart the above conductivity to the ink: preferably their amount is from 0.1 to 20% by weight, more preferably from 0.1 to 10% by weight and better still from 0.1 to 5% by weight.

The composition according to the invention may, in addition, comprise one or more additives chosen from compounds which improve the solubility of some of its components, the print quality, the adhesion, or else the control of the wetting of the ink on various supports.

The additive(s) could be chosen, for example, from anti-foaming agents; chemical stabilizers; UV stabilizers; surfactants, such as Fluorad® FC 430 or Byk® 333; agents that inhibit salt corrosion; bactericides, fungicides and biocides; and pH control buffers, etc.

The additive(s) is (are) used in very low doses, in general less than or equal to 5% and sometimes as low as 0.01%, depending on whether they are anti-foaming agents, stabilizers or surfactants.

The invention also relates to a process for preparing the ink composition such as has been described above, which comprises the following successive steps:

a) a reaction medium is prepared that comprises the hydroxyaromatic, preferably hydroxyphenolic, resin, the alkoxysilane, an organic solvent that does not interfere in the reaction between the alkoxysilane and the hydroxyaromatic resin, and optionally the other ingredients of the ink composition which do not interfere in the reaction between the alkoxysilane and the hydroxyaromatic resin;

b) a reaction is carried out between the alkoxysilane and the hydroxyaromatic resin by means of which a solution of binder resin in the solvent is obtained;

c) when the reaction is complete or almost complete, added to the solution of binder resin are the other ingredients of the ink composition which interfere in the reaction between the alkoxysilane and the hydroxyaromatic resin, and optionally the other ingredients of the ink which do not interfere in the reaction between the alkoxysilane and the hydroxyaromatic resin, if the latter were not present in the reaction medium.

In this preparation process, the reaction between the hydroxyaromatic, in particular hydroxyphenolic, resin and the silane is carried out prior to the addition of the other ingredients of the ink, at least in all the cases prior to the addition of the other ingredients of the ink that disrupt the reaction between the alkoxysilane and the hydroxyaromatic resin, and especially the dealcoholization reaction, in other words that interfere in this reaction between the alkoxysilane and the hydroxyaromatic resin, and especially in the dealcoholization reaction.

A person skilled in the art can easily determine, optionally by resorting to routine trials, which are the ingredients of the ink that disrupt or do not disrupt the reaction.

The reaction between the hydroxyaromatic resin and the alkoxysilane should be complete or almost complete before adding the other ingredients of the ink.

The expression "complete or almost complete" is generally understood to mean that the reaction, and in particular the dealcoholization reaction, is carried out to more than 80%.

By proceeding in this way, a better control of the chemical reaction(s) involved is achieved since the initial reaction medium does not contain an ingredient capable of disrupting or hindering the reaction.

The progress of the reaction can be followed by measuring or assaying, for example by gas chromatography, the amount of alcohol generated that results from the reaction of the alkoxy groups of the alkoxysilane with the hydroxyl groups of the hydroxyaromatic, in particular hydroxyphenolic, resin. This amount is therefore a function of the number of alkoxy groups of the silane molecule. A very large increase in the viscosity may also be observed following this reaction, until a stabilization is obtained when the reaction is practically finished.

The reaction may be carried out at ambient temperature or a temperature above ambient temperature by heating the reaction medium, preferably under the conditions already specified above, in order to accelerate this reaction and to make the ink more stable over time. Therefore, the production of a stable ink is rendered more industrial.

The fact of waiting for the reaction between the hydroxyaromatic, in particular hydroxyphenolic, resin and the alkoxysilane to be practically or completely finished, whether this is at ambient temperature or at a higher temperature, allows better control of the viscosity of the ink and of the change thereof over the storage time.

The other ingredients of the formulation (disruptive ingredients) which are added when the reaction is complete or almost complete make it possible, in particular, to adjust its viscosity and its conductivity to the desired values.

The reaction medium may be prepared by firstly putting into solution in the solvent the hydroxyphenolic resin or else the alkoxysilane or else the other ingredients of the composition which do not disrupt the reaction between the hydroxyaromatic, in particular hydroxyphenolic, resin and the alkoxysilane, then by adding to this solution, successively or simultaneously, the other two components of the reaction medium, these components possibly being added pure or in solution in the solvent.

Thus, the other ingredients of the composition which do not disrupt the reaction between the silane and the hydroxyaromatic, in particular hydroxyphenolic, resin may be added at the same time as the hydroxyaromatic, in particular hydroxyphenolic, resin such as a novolac, to the silane in solution, or else they may be added at the same time as the silane to the hydroxyaromatic, in particular hydroxyphenolic, resin in solution.

Or else, the other ingredients that do not disrupt the reaction between the silane and the hydroxyaromatic, in particular hydroxyphenolic, resin may be added during step c) to the solution of binder resin.

Or else, a portion of the other ingredients which do not disrupt the reaction between the silane and the hydroxyaromatic, in particular hydroxyphenolic, resin may be added during step a) and another portion may be added during step c).

The invention also relates to a process for marking substrates, supports or objects by spraying an ink onto these substrates, supports or objects by the continuous deflected jet technique, in which the ink sprayed is the ink composition according to the invention, as described in the aforegoing.

The invention also relates to a substrate, support or object provided with a marking obtained by drying and/or absorption (in the support, substrate) of the ink composition according to the invention.

This substrate may be made of metal, for example, aluminium or steel; made of glass; made of ceramic; made of a material containing cellulose such as paper, optionally coated or glossy paper, board or wood; made of a synthetic polymer ("plastic") especially in the form of films, such as PVCs, PETs, polyolefins such as polyethylenes (PEs), or polypropylenes (PPs); made of "Plexiglas"; made of fabric; or made of any other non-porous or porous substance or made from a composite of several of the preceding materials.

This substrate may be porous or non-porous.

This substrate may especially be a container or vessel such as a glass bottle.

The invention will be better understood on reading the following description of embodiments of the invention, given by way of illustrative and non-limiting examples.

Ink compositions according to the invention were prepared by mixing the products mentioned in Table I in the proportions indicated. Table I also gives the viscosity and the conductivity of the inks obtained.

The values of the properties measured are those which are obtained after stabilization, either when the reaction between the alkoxysilane and the hydroxyphenolic resin is carried out at ambient temperature, or after a moderate heating which accelerates this reaction.

TABLE I

| Constituents (weight percentages) | No. 1 | No. 2 | No. 3 | No. 4 | No. 5 | No. 6 | No. 7 | No. 8 |
|---|---|---|---|---|---|---|---|---|
| Pure (>99%) methyl ethyl ketone containing less than 0.1% of water | 74.7 | 71.9 | 64.3 | 72.9 | 68.2 | 70.8 | 68.4 | 67.9 |
| Phenolic novolac resin (Alcohol PN 430 from CdTe) | 18.7 | 19.7 | 21.4 | 18.5 | 22.7 | | | |
| Phenolic novolac resin (Alcohol PN 320 from CdTe) | | | | | | 20.8 | 22.8 | 22.6 |
| Gammaaminopropyltriethoxysilane | 2.1 | | | | | 2.5 | | |
| Gammaaminopropyltrimethoxysilane | | | | | | | 1.8 | |
| N-(2-aminoethyl)-3-aminopropyl-trimethoxysilane | | | | | | | | 2.3 |
| 3-aminopropylmethyldiethoxysilane | | 2.8 | | | | | | |
| 3-aminopropyldiisopropylethoxysilane | | | 8.4 | | | | | |
| 3-(1,3-dimethylbutylidene)-aminopropyltriethoxysilane | | | | 3 | | | | |
| Bis(trimethoxysilylpropyl)amine | | | | | 2.3 | | | |
| Solvent Black 29 (Orasol ® black RLI) | 3.7 | 4.6 | 4.8 | 4.7 | 4.7 | 4.6 | 5.7 | 5.9 |
| Surfactant (Byk 333) | 0.1 | 0.1 | 0.1 | 0.1 | 0.1 | 0.1 | 0.1 | 0.1 |
| Tetrabutylammonium hexafluorophosphate | 0.7 | 0.9 | 1 | 0.8 | 1.1 | 1.2 | 1.2 | 1.2 |
| Estimated Si—O-alkoxy/novolac molar ratio | 0.5 | 0.5 | 0.61 | 0.54 | 0.60 | 0.55 | 0.44 | 0.46 |
| Viscosity (mPa · s) | 3.91 | 4.35 | 5.31 | 4.5 | 5.9 | 4.8 | 5.08 | 4.4 |
| Conductivity (µS/cm) | 621 | 723 | 642 | 650 | 654 | 605 | 555 | 545 |

The molar ratio is calculated with a molar mass of 336 for the novolac.

An electrical conductivity meter (CDM210, Conductivity Cell CDC641T, Radiometer Analytical) is used to measure the electrical conductivity in the ink. The instrument measures and calculates the conductance of the ink and then, by taking the cell data into account, the conductivity. The conductivity values are given in µS/cm. All measurements are done at a reference temperature of 20° C.

The compositions according to Table I, in accordance with the invention, are prepared by mixing the hydroxyphenolic resin in the solvent until it is completely dissolved. The silane is added to this solution. Observed from this moment is an increase in the viscosity and at the same time, by gas chromatography, the appearance of the alcohol corresponding to the hydrolysed alkoxy groups of the silane derived from the reaction between the alkoxy groups of the silane and the hydroxyl groups of the hydroxyphenolic resin. This change can be followed over time.

In order to accelerate this reaction, all the preparations were heated at 70° C. for at least 18 hours.

When the amount of alcohol revealed is equal to at least 80% of what may be released from the decomposition of the silane, it is possible to add the other ingredients of the formulation.

It is deduced therefrom that during the heating there is a decomposition of the silane even in the absence of water, or in the presence of traces of water only.

The inks thus prepared were deposited using a micropipette onto glass bottles that were first washed with 2% sodium hydroxide, rinsed and dried. Deposited on the same bottle were the Markem-Imaje® inks referenced 5538 and FT333 as a control comparison, as these inks are currently used for the same application: namely the marking of returnable glass bottles that have undergone an alkali washing operation, for example with sodium hydroxide.

A few minutes after the deposition of the ink, the markings were immersed in water for 15 minutes then rubbed with a finger until the markings of the controls were damaged. All the markings produced with the formulations 1 to 8 remained intact.

After drying for 24 hours, the same markings on another bottle were subjected to a 24 hour dipping operation in water and the same rubbing test was repeated. The markings produced with the formulations 1 to 8 held out better than the control markings.

These markings were then dipped in a 2% aqueous solution of sodium hydroxide. The markings produced with the compositions 1 to 8 according to the invention disappeared by dissolving more rapidly (in less than one minute) than the control markings which only disappeared at the end of a few minutes.

Furthermore, each of these examples gives inks whose properties remain stable over time. Thus, by subjecting the formulations described to a temperature of 50° C. for 4 weeks, an accelerated ageing was induced that is estimated to be equivalent to 7 months of ageing at ambient temperature.

After this ageing, it was possible to observe that the viscosity and the conductivity of the ink compositions according to the invention had not varied by more than 10%, and that the resistance to rubbing in water, and the alkali solubility of the markings obtained with the compositions according to the invention remained unchanged.

Formulation No. 1 was tested in type S8 Imaje® printers and made it possible to obtain printing of excellent quality on glass bottles filled with water at 4° C. Furthermore, the markings thus produced are resistant to rubbing with a finger even in the presence of water immediately after marking.

These markings are also resistant to rubbing after a prolonged immersion in water, and may be erased by dissolving in an alkaline solution at pH greater than 12.

Contrary to what is put forward in document U.S. Pat. No. 4,045,397, it has been possible to show that there is no reaction between the amino group of the aminosilane and the novolac molecule. On the contrary, it has been shown that there is a decomposition of the alkoxy groups during the

The invention claimed is:
1. Ink composition for continuous deflected jet printing, that is liquid at ambient temperature, comprising:
   a solvent containing less than 0.5% by weight of water and less than 0.5% by weight of alcohols, relative to the total weight of the ink composition;
   one or more dye(s) and/or pigment(s) that is (are) insoluble in water, and in mixtures of water and of at least one alcohol; and
   a binder, comprising at least 50% by weight, relative to the total weight of the binder, of at least one binder resin obtained by reaction between at least one alkoxysilane and at least one hydroxyaromatic resin.
2. Ink composition according to claim 1, in which the binder resin is obtained by at least one dealcoholization reaction between the alkoxy group or groups of the alkoxysilane and the aromatic hydroxyl group or groups of the hydroxyaromatic resin.
3. Ink composition according to claim 1, in which the binder consists of said at least one binder resin.
4. Ink composition according to claim 1, in which said alkoxysilane is comprised of the following formula:

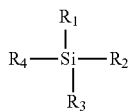

where:
   $R_1$ is a linear or branched $C_1$ to $C_4$ alkoxy group;
   $R_2$ and $R_3$, independently of one another, represent a group chosen from linear or branched $C_1$ to $C_4$ alkyl groups or linear or branched $C_1$ to $C_4$ alkoxy groups; and
   $R_4$ represents a linear or branched $C_1$ to $C_{20}$ alkyl group bearing, and/or being interrupted by at least one functional group X chosen from epoxy, amino (—$NH_2$), —NH—, =N—, acrylate, carbonyl, (meth)acrylate, anhydride, halogen, vinyl, olefin, isocyanate, and mercapto groups, or —$Si(R_1R_2R_3)$ groups.
5. Ink composition according to claim 4, in which $R_4$ is selected from the group consisting of the following formulae:

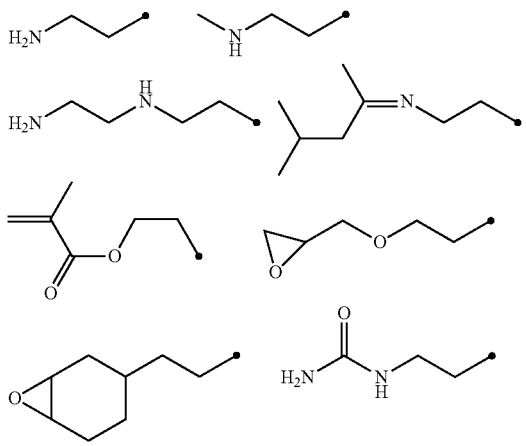

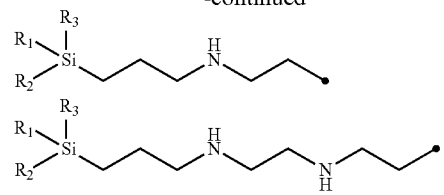

where ● represents the point of attachment of the $R_4$ group with the silicon atom of the alkoxysilane.
6. Ink composition according to claim 4, in which the alkoxysilane is an aminoalkoxysilane in which $R_4$ represents a linear or branched $C_1$ to $C_{20}$ alkyl group bearing and/or being interrupted by at least one group chosen from amino, —NH— or =N— groups.
7. Ink composition according to claim 6, in which $R_4$ is selected from the group consisting of:

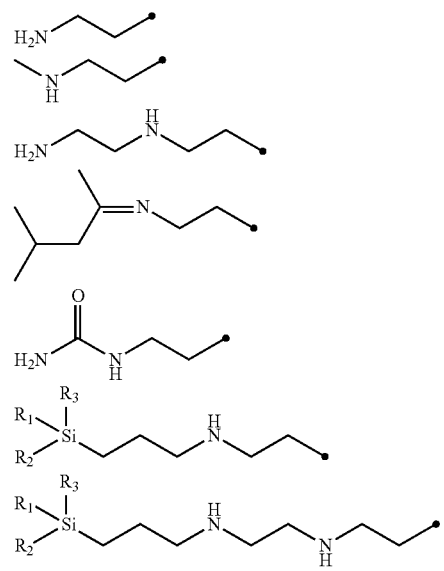

where ● represents the point of attachment of the $R_4$ group with the silicon atom of the alkoxysilane.
8. Ink composition according to claim 6, in which the alkoxysilane is chosen from gamma-aminopropyltriethoxysilane, gamma-aminopropyltrimethoxysilane, N-(2-aminoethyl)-3-aminopropyltri-methoxysilane, 3-aminopropylmethyldiethoxysilane, 3-aminopropyldiisopropylethoxysilane, 3-(1,3-dimethylbutylidene)aminopropyltriethoxysilane, or bis(trimethoxysilylpropyl)amine.
9. Ink composition according to claim 1, in which the hydroxyaromatic resin is chosen from hydroxyphenolic resins.
10. Ink composition according to claim 9, in which the hydroxyphenolic resins are chosen from novolac resins or hydroxystyrene polymers.
11. Ink composition according to claim 1, in which the binder resin is obtained by reaction between an aminoalkoxysilane and a hydroxystyrene polymer.
12. Ink composition according to claim 1, wherein the reaction between the alkoxysilane and the hydroxyaromatic resin is carried out in an organic solvent.
13. Ink composition according to claim 12, in which the reaction between the alkoxysilane and the hydroxyaromatic resin is carried out in solution in an organic solvent comprising less than 0.5% by weight of water and less than 0.5% by weight of alcohols.

14. Ink composition according to claim 12, in which the solvent of the reaction between the alkoxysilane and the hydroxyaromatic resin is chosen from ketones.

15. Ink composition according to claim 12, in which the solvent for the reaction between the alkoxysilane and the hydroxyaromatic resin is the solvent of the ink composition.

16. Ink composition according to claim 1, in which the reaction between the hydroxyaromatic resin and the alkoxysilane is carried out at ambient temperature.

17. Ink composition according to claim 1, in which the reaction between the hydroxyaromatic resin and the alkoxysilane is carried out by heating the hydroxyaromatic resin, the alkoxysilane and the solvent at a temperature above ambient temperature for a duration of 1 to 72 hours.

18. Ink composition according to claim 1, in which the reaction between the alkoxysilane and the hydroxyaromatic resin is carried out without solvent.

19. Ink composition according to claim 1, in which the molar ratio between the alkoxysilane groups of the alkoxysilane compound and the hydroxyaromatic resin is from 0.05 to 3.00.

20. Ink composition according to claim 1, in which the binder represents from 0.1 to 30% by weight of the total weight of the ink composition.

21. Ink composition according to claim 1, in which the solvent represents from 30 to 90% by weight of the total weight of the ink composition.

22. Ink composition according to claim 1, in which the solvent of the composition is chosen from ketones.

23. Ink composition according to claim 22, wherein the solvent of the reaction between the alkoxysilane and the hydroxyaromatic resin consists of one or more ketone(s).

24. Ink composition according to claim 22, comprising one or more other organic solvent(s) in a minority proportion by weight relative to the total weight of the solvent.

25. Ink composition according to claim 1, in which said dye(s) and/or pigment(s) is (are) chosen from the dyes and pigments known under the name of C.I. Solvent Dyes or C.I. Pigments.

26. Ink composition according to claim 25, in which the dye is a C.I. Solvent Black 29.

27. Ink composition according to claim 1, comprising, in total, from 0.05 to 25% by weight of dye(s) and/or pigment(s) relative to the total weight of the ink composition.

28. Ink composition according to claim 1, comprising, in addition, one or more plasticizer(s) in an amount of at least 0.05% by weight of the total weight of the ink composition.

29. Ink composition according to claim 1, comprising, in addition, at least one conductivity salt in amount of 0.1 to 20% by weight of the total weight of the ink composition.

30. Ink composition according to claim 29, wherein said conductivity salt is chosen from salts that are insoluble in water.

31. Ink composition according to claim 1, which has a conductivity, in the liquid state, greater than 5 µS/cm at 20° C.

32. Ink composition according to claim 1, comprising, in addition, one or more additive(s) chosen from anti-foaming agents; chemical stabilizers; UV stabilizers; surfactants; agents that inhibit corrosion by salts; bactericides, fungicides, biocides; or pH control buffers.

33. Process for preparing the ink composition according to claim 1, which comprises the following successive steps:
  a) a reaction medium is prepared that comprises the hydroxyaromatic resin, the alkoxysilane, an organic solvent that does not interfere in the reaction between the alkoxysilane and the hydroxyaromatic resin, and optionally other ingredients of the ink composition which do not interfere in the reaction between the alkoxysilane and the hydroxyaromatic resin;
  b) a reaction is carried out between the alkoxysilane and the hydroxyaromatic resin by means of which a solution of binder resin in the solvent is obtained;
  c) when the reaction is complete or almost complete, added to the solution of binder resin are other ingredients of the ink composition which interfere in the reaction between the alkoxysilane and the hydroxyaromatic resin and optionally other ingredients of the ink which do not interfere in the reaction between the alkoxysilane and the hydroxyaromatic resin, if the latter were not present in the reaction medium.

34. Process according to claim 33, in which the reaction is carried out at ambient temperature or at a temperature above ambient temperature by heating the reaction medium.

35. Process according to claim 33, in which the progress of the reaction is followed by measuring or assaying, the amount of alcohol generated resulting from the reaction of the alkoxy groups of the alkoxysilane with the hydroxyl groups of the hydroxyaromatic resin.

36. Process for marking substrates, supports or objects by spraying an ink onto these substrates, supports or objects by the continuous deflected jet technique, wherein the ink sprayed is an ink composition according to claim 1.

37. Substrate, support or object, wherein the substrate, support or object is provided with a marking obtained by drying and/or absorption of the ink composition according to claim 1.

38. Substrate, support or object according to claim 37, wherein the substrate is made of metal, glass, ceramic, a material containing cellulose, a synthetic polymer ("plastic"), "Plexiglas", fabric, or non-porous or porous substance or made from a composite of several of the preceding materials.

39. Substrate, support or object according to claim 38, which is a container.

40. Ink composition according to claim 4, wherein $R_4$ represents a linear or branched $C_1$ to $C_{10}$ alkyl group bearing, and/or being interrupted by at least one functional group X chosen from epoxy, amino (—$NH_2$), —NH—, =N—, acrylate, carbonyl, (meth)acrylate, anhydride, halogen, vinyl, olefin, isocyanate, and mercapto groups, or —Si($R_1R_2R_3$) groups.

41. Ink composition according to claim 4, in which the alkoxysilane is an aminoalkoxysilane in which $R_4$ represents a linear or branched $C_1$ to $C_{10}$ alkyl group bearing and/or being interrupted by at least one group chosen from amino, —NH— or =N— groups.

42. Ink composition according to claim 12, in which the reaction between the alkoxysilane and the hydroxyaromatic resin is carried out in solution in an organic solvent comprising less than 0.1% by weight of water and less than 0.1% by weight of alcohols.

43. Ink composition according to claim 12, in which the reaction between the alkoxysilane and the hydroxyaromatic resin is carried out in solution in an organic solvent comprising less than 0.05% by weight of water and less than 0.05% by weight of alcohols.

44. Ink composition according to claim 12, in which the reaction between the alkoxysilane and the hydroxyaromatic resin is carried out in solution in an organic solvent that is essentially free of water and of alcohols.

45. Ink composition according to claim 12, wherein the solvent of the reaction between the alkoxysilane and the hydroxyaromatic resin is chosen from aliphatic ketones having 3 to 10 carbon atoms.

46. Ink composition according to claim 45, wherein the aliphatic ketones are comprised of any one or more of acetone, butanone (methyl ethyl ketone), 2-pentanone (methyl propyl ketone), 3-methyl-2-butanone (methyl isopropyl ketone) or 4-methyl-2-pentanone (methyl isobutyl ketone), and mixtures thereof.

47. Ink composition according to claim 12, wherein the solvent of the reaction between the alkoxysilane and the hydroxyaromatic resin is chosen from cyclic ketones.

48. Ink composition according to claim 47 wherein the solvent of the reaction between the alkoxysilane and the hydroxyaromatic resin is cyclohexanone.

49. Ink composition according to claim 12 wherein the solvent of the reaction between the alkoxysilane and the hydroxyaromatic resin is dimethylformamide (DMF).

50. Ink composition according to claim 12 wherein the solvent of the reaction between the alkoxysilane and the hydroxyaromatic resin is dimethylacetamide (DMAc).

51. Ink composition according to claim 17, in which the reaction between the hydroxyaromatic resin and the alkoxysilane is carried out by heating the hydroxyaromatic resin, the alkoxysilane and the solvent at a temperature greater than or equal to 40° C.

52. Ink composition according to claim 17, in which the reaction between the hydroxyaromatic resin and the alkoxysilane is carried out by heating the hydroxyaromatic resin, the alkoxysilane and the solvent at a temperature of 40° C. to the boiling point of the solvent.

53. Ink composition according to claim 17, in which the reaction between the hydroxyaromatic resin and the alkoxysilane is carried out by heating the hydroxyaromatic resin, the alkoxysilane and the solvent at a temperature from 40° C. to 80° C.

54. Ink composition according to claim 17, in which the reaction between the hydroxyaromatic resin and the alkoxysilane is carried out by heating the hydroxyaromatic resin, the alkoxysilane and the solvent at 70° C.

55. Ink composition according to claim 17, in which the reaction between the hydroxyaromatic resin and the alkoxysilane is carried out for a duration of 12 to 60 hours.

56. Ink composition according to claim 17, in which the reaction between the hydroxyaromatic resin and the alkoxysilane is carried out for a duration of 24 to 48 hours.

57. Ink composition according to claim 1, in which the binder represents from 1 to 25% by weight of the total weight of the ink composition.

58. Ink composition according to claim 1, in which the binder represents from 3 to 20% by weight of the total weight of the ink composition.

59. Ink composition according to claim 1, in which the solvent represents from 60 to 80% by weight of the total weight of the ink composition.

60. Ink composition according to claim 1, wherein the solvent of the ink composition is chosen from ketones.

61. Ink composition according to claim 60, wherein the ketones are comprised of any one or more of: acetone, butanone (methyl ethyl ketone), 2-pentanone (methyl propyl ketone), 3-methyl-2-butanone (methyl isopropyl ketone) or 4-methyl-2-pentanone (methyl isobutyl ketone), and mixtures thereof.

62. Ink composition according to claim 25, in which the dye is chosen from C.I. Solvent Black 7, C.I. Solvent Black 28, C.I. Solvent Black 35, C.I. Solvent Blue 70, C.I. Solvent Red 124, and the pigment is chosen from dispersions of Pigment Blue 60 or of Pigment Blue 15.

63. Ink composition according to claim 1, comprising, in total, from 1 to 20% by weight of dye(s) and/or pigment(s) relative to the total weight of the ink composition.

64. Ink composition according to claim 1, comprising, in total, from 3 to 10% by weight of dye(s) and/or pigment(s) relative to the total weight of the ink composition.

65. Ink composition according to claim 1, comprising, in addition, one or more plasticizer(s) in an amount of at least 0.1 to 20% by weight of the total weight of the ink composition.

66. Ink composition according to claim 1, comprising, in addition, at least one conductivity salt in amount of 0.1 to 10% by weight of the total weight of the ink composition.

67. Ink composition according to claim 1, comprising, in addition, at least one conductivity salt in amount of 0.1 to 5% by weight of the total weight of the ink composition.

68. Ink composition according to claim 1, which has a conductivity, in the liquid state, greater than or equal to 300 µS/cm at 20° C.

69. Ink composition according to claim 1, which has a conductivity, in the liquid state, greater than or equal to 500 µS/cm at 20° C.

70. Ink composition according to claim 1, which has a conductivity, in the liquid state, from 500 µS/cm to 2000 µS/cm at 20° C.

71. The process according to claim 33 wherein the hydroxyaromatic resin is a hydroxyphenolic resin.

72. Substrate, support or object according to claim 38, wherein the metal is aluminum or steel.

73. Substrate, support or object according to claim 38, wherein the material containing cellulose is any one or more of: paper, coated or glossy paper, board, wood, or a composite thereof.

74. Substrate, support or object according to claim 38, wherein the synthetic polymer ("plastic") is any one or more of PVCs, PETs, polyolefins, or a composite thereof.

75. Substrate, support or object according to claim 38, which is a glass bottle.

76. Ink composition according to claim 12, wherein said organic solvent does not interfere in the reaction between the hydroxyaromatic resin and the alkoxysilane.

77. Ink composition according to claim 76, wherein said organic solvent does not interfere in the dealcoholization reaction between the alkoxy groups of the alkoxysilane and the aromatic hydroxyl groups of the hydroxyaromatic resin, and does not give rise to a hydrolysis/alcoholysis reaction of the alkoxy groups.

78. Ink composition according to claim 77, wherein said hydroxyaromatic resin is a hydroxyphenolic resin.

79. Ink composition according to claim 14, wherein said ketone(s) is (are) selected from the group consisting of acetone, methyl ethyl ketone, methyl propyl ketone, methyl isopropyl ketone and methyl isobutyl ketone.

80. Ink composition according to claim 23, wherein said ketone(s) is (are) selected from the group consisting of acetone, methyl ethyl ketone, methyl propyl ketone, methyl isopropyl ketone and methyl isobutyl ketone.

81. Ink composition according to claim 30, wherein said salts that are insoluble in water are chosen from among the group consisting of salts of alkali metals, salts of alkaline-earth metals or salts of simple or quaternary ammoniums.

82. Ink composition according to claim 60, wherein the solvent of the ink composition is chosen from aliphatic ketones having 3 to 10 carbon atoms, cyclic ketones, dimethylformamide, dimethylacetamide, and mixtures thereof.

83. Ink composition according to claim 74, wherein said polyolefins are selected from among the group consisting of polyethylenes (PEs) and polypropylenes (PPs).

84. Ink composition according to claim 82, wherein said cyclic ketones is cyclohexanone.

85. Ink composition according to claim 81, wherein said salts are in the form of halides, perchlorates, nitrates, thiocyanates, formates, acetates, sulphates, hexafluorophosphates, hexafluoroantimonates or propionates.

\* \* \* \* \*